United States Patent Office 3,819,796
Patented June 25, 1974

3,819,796
METHOD OF FORMING FOAMED POLYOLEFIN CASTS ON A LIVING BODY
Joseph George Webster, Croydon, and William Henry Tuck, Kenton, England, assignors to Bakelite Xylonite Limited, London, England
Continuation-in-part of application Ser. No. 868,242, Oct. 21, 1969, now Patent No. 3,662,057, which is a continuation of abandoned application Ser. No. 731,253, May 22, 1968. This application May 8, 1972, Ser. No. 251,327
Claims priority, application Great Britain, May 25, 1967, 24,473/67
The portion of the term of the patent subsequent to May 9, 1989, has been disclaimed
Int. Cl. B29c 23/00; B29d 27/00
U.S. Cl. 264—321                            20 Claims

ABSTRACT OF THE DISCLOSURE

A method of forming a cast for a portion of a living body comprises bringing a sheet of a foamed, at least partially cross-linked, thermoplastics material, such as polyethylene, to a temperature which plasticizes it and renders it pliable without destruction of its foamed, cellular character. The pliable themosplastics material can be shaped directly onto a living body. After cooling the material can be shaped directly onto a living body. After cooling the material sets in the configuration of the body.

The technique can be used in the formation of orthopaedic supports.

The material may have a reinforcing member embedded within it.

CROSS-REFERENCE TO RELATED APPLICATIONS

This application is a continuation-in-part of our application U.S. Ser. No. 868,242, filed Oct. 21, 1969 and now Pat. No. 3,662,057, which was a continuation of our application U.S. Ser. No. 731,253, filed May 22, 1968 and now abandoned.

BACKGROUND OF THE INVENTION

Field of the Invention

This invention relates to a method of forming a cast directly on a living body, the cast being formed from a sheet of foamed, at least partially cross-linked thermoplastics materials selected as hereinafter described from the homopolymers and copolymers of polyethylene.

Description of the Prior Art

In the treatment of injured parts of the body such as broken limbs, or joints affected by certain complaints, it is usually necessary to immobilise the part in order that healing may be effected. In conventional practice, this is done by wrapping the injured limb to a splint or encasing it in plaster of Paris. Surgical corsets are also widely used. These procedures, while clinically effective, are associated with several disadvantages, and cause a certain amount of inconvenience both to the attendant physician and patient. For instance, conventional plaster of Paris is heavy and bulky, so that the patient's movements are restricted. Also, its preparation as well as its application in the formation of the cast are time-consuming and tedious procedures. Further in removing the cast from the part being treated, it must be destroyed, and this single service use is inefficient and uneconomical. Moreover, it is extremely difficult to ensure that the plaster cast fits closely to the body contours, as is desirable for many therapeutic supports, for example, in the treatment of arthritic pain. Leather has been widely used in making orthopaedic appliances, but the techniques which have to be used with this material are laborious. The leather has to be soked in water to mellow it and then allowed to dry for 24 hours. It is then made up into the appliance on a positive cast of the patient. It cannot be shaped directly onto the patient and a further disadvantage is that it cannot easily be reshaped if an alteration is necessary.

Of recent years, as an alternative to plaster of Paris for a limited number of purposes, splints have been made from a thermoplastics material such as polyethylene in the form of a solid sheet. In forming these splints, the polyethylene is heated to a temperature at which it is soft and deformable and, in this condition, moulded to the required shape. The high temperature needed to soften the polyethylene (around 150° C.), combined with the fact that it is employed in solid form, exclude direct moulding onto the patient. This is also a disadvantage of a known modification of this type of splint, in which the solid polyethylene sheet is lined with a flexible spongy material such as a thermosetting polyurethane. In laminate structures of this sort, the polyethylene layer is needed to hold the flexible polyurethane layer to the required shape when the laminate has cooled and set. In such laminates, the presence of the polyethylene face layer hinders the diffusion of heat away from the polyurethane to an extent that, in practice, the laminate cannot be moulded direct onto a living body. Moreover, the non-expanded polyethylene on the outside of these laminates is unpleasant to the skin when hot and this makes them difficult to handle and mould at the temperatures to which they are heated. In both instances, therefore, it is necessary to take a conventional plaster cast of the injured part, and then to utilize this negative in the preparation of the thermoplastic splint. This type of splint is described in U.S. patent specification No. 2,759,475.

U.S. patent specification No. 3,048,169 suggests a method of making a cast on a living body in which one or more prepolymers and a catalyst are introduced into a flexible plastics bag or envelope and are reacted together in the envelope to produce a foamed polyurethane. While the mixture in the envelope is still undergoing reaction and while the contents of the envelope are still in a fluid state they are smoothed to form a substantially flat, mouldable sheet which is allowed to set for a short time until the material reaches a firm but pliable state. The pliable sheet is then shaped and moulded onto the part of the living body for which the cast is required.

This method of forming a cast directly onto a patient is a very skilled operation. The technique requires a mixing or dispensing gun and the preparation of the foamed material is time-consuming. The chemical reagents used in the preparation of rigid polyurethane foam are unacceptable medically. The catalysts used (usually amines) are undesirable for use in close proximity to the patient. The isocyanates used are often extremely poisonous and can be absorbed through the skin. It was also suggested that the cast would be remouldable by applying heat to the part of the cast requiring alteration for a short time and subsequently gently and gradually adjusting the shape of the cast. The suggested method, however, appears to be one of considerable complexity in practice. There is usually great difficulty involved in thermoforming rigid polyurethane foam and in general only simple shaping and bending can be carried out. In the field of medical casts and orthopaedic supports, greater accuracy in the finished case is required and, therefore, in the method of the present invention it is not a practical proposition to thermoform rigid polyurethane foam.

Light-weight cellular structures are well-known, and a variety of procedures are available for their production. Materials of this type which, for convenience, will be referred to in this specification as expanded thermoplastics materials, because of their cellular, i.e. macroporous structure, have a low density, a low thermal conductivity and a low heat storage capacity.

The terms "expanded" and "foamed" as used in this specification in connection with the thermoplastics material are used synonomously to denote such a material having a cellular character. The formation of such thermoplastics materials usually involved heating in the presence of a blowing agent, for example, nitrogen gas.

SUMMARY OF THE INVENTION

The present invention provides a method of thermoplastically shaping a sheet of expanded at least partially cross-linked thermoplastics material to the configuration of a portion of a living body which comprises heating the material, which may have one or more reinforcing members embedded within it, to a temperature which plasticizes it without destruction of its essential cellular nature so that it becomes pliable, bringing the plasticized material and the portion of the living body into contact so as to form an impression in the material and, thereafter, allowing the material to cool when it sets in the configuration of the body.

The expression "thermoplastically shaping" as used in this specification and appended claims, indicates that the shaping of the material is accomplished, in part, through softening the material by heat in which condition it is pliable and can readily be moulded.

The foamed thermoplastics materials used in the method of the present invention are at least partially cross-linked and are selected from the group consisting of low density polyethylene, high density polyethylene, copolymers of ethylene with vinyl acetate containing up to 20% by weight of vinyl acetate, and copolymers of ethylene with ethyl acrylate containing up to 20% by weight of ethyl acrylate. The foamed thermoplastics material has a density of from 10 to 100 kilograms per cubic metre (kg. m.$^{-3}$) and may be termed "rigid or semi-rigid" but it must be admitted that they are relative terms and in order to avoid obscurity in defining the polymeric materials to be used in the present invention, the polymeric materials have been defined in terms of density.

The thermoplastics materials are at least partially cross-linked and by this it is intended that they have a degree of cross-linking corresponding to that resulting from an exposure thereof to about 1 to about 10 megarads of radiation. The thermoplastics materials have a closed cell structure.

The sheet of thermoplastics material has an initial thickness in the range of 0.3 centimeters upwards.

In the method of the present invention a sheet of thermoplastics material of the kind described above is heated to a temperature within the range of from about 125° C. to 155° C. to thereby plasticize the sheet and render it pliable without destruction of its expanded, cellular character. The heated sheet is then placed into direct contact with the portion of a living body for which a cast is required and sufficient pressure is applied to the pliable sheet to cause the sheet to be shaped into a cast. The cast thus assumes a configuration which complements the shape of the particular portion of the living body.

The shaped cast is permitted to cool in the configuration so that it assumes its original degree of rigidity.

More specifically, the present invention provides a method of forming a cast for a portion of a living body from a sheet of nitrogen foamed, closed cell, at least partially cross-linked polyethylene. The preferred material for use in connection with the present invention has a degree of cross-linking corresponding to that resulting from the absorption therein of between 1 and 10 megarads of radiation. Moreover, the preferred polymer has a density corresponding to that obtained by subjecting such cross-linked polymer to nitrogen foaming at a pressure between 1,000 and 12,000 pounds per square inch and at a temperature at least 10° F. higher than the softening temperature of the cross-linked polymer. Preferably the foamed, cross-linked polyethylene sheet has an initial thickness in the range of from about 0.3 centimeters upwards. The method of forming a cast from such a sheet comprises (a) heating a sheet of such foamed, cross-linked polyethylene to a temperature within the range of from about 125° C. to about 155° C. to thereby plastify the sheet and render the same pliable without destruction of its formed, cellular character; (b) placing the heated sheet into direct contact with a portion of a living body and applying sufficient pressure to the pliable sheet to cause the same to be shaped into a cast having a configuration complementing the shape of said portion; and (c) permitting said shaped cast to cool so that it resumes its original degree of rigidity.

BRIEF DESCRIPTION OF THE DRAWINGS

This invention is further illustrated in the accompanying drawings to which some of the specific examples of the present invention refer.

In the drawings.

DESCRIPTION OF THE PREFERRED EMBODIMENTS

Figure 1:
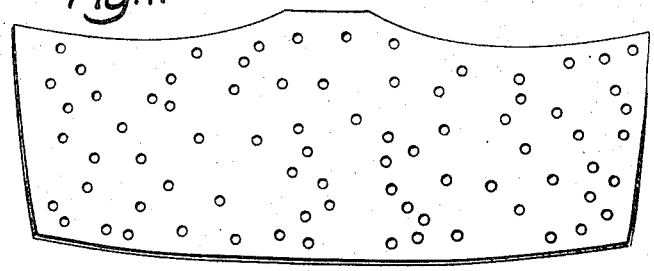
FIG. 1 is a diagrammatic small scale plan view of a flat piece of Plastazote suitably shaped for making a support in the form of a cervical collar.

The expanded thermoplastics materials which are used in the method of the present invention are low density polyethylene, high density polyethylene and copolymers of ethylene with up to 20% by weight vinyl acetate or ethyl acrylate. A highly preferred material for the present method is a nitrogen-filled, cross-linked, cellular, low density polyethylene commercially available as "Plastazote" sheet ("Plastazote" is a Registered Trademark). This material is made by a process as described in British Pat. No. 899,389 which comprises first subjecting low density polyethylene to a modification treatment either by exposing the polymer to ionising radiation or by heating the polymer in the presence of an organic peroxide to a temperature at which the organic peroxide dissociates into free radicals. After the modification treatment the polymer is heated in the presence of nitrogen under pressure to a temperature higher than the softening temperature of the modified polymer. The material is then expanded at a lower pressure.

In the case where the ethylene polymer to be expanded is modified by ionising radiation, the shape of the polymeric article may be formed by conventional means prior to the modification process, or the ethylene polymer may be modified in the form of chips or granules which can be processed subsequently to present the desired shape. When free radicals are used as the modifying agent, the free radicals are obtained by the dissociation of an organic peroxide with heat. The organic peroxide is blended intimately with the ethylene polymer using conventional mixing equipment such as a mill or an extruder and during the mixing cycle or subsequently the polymer is modified by heating the composition at least to the temperature at which the organic peroxide dissociates into free radicals. The modification may be accomplished prior to forming the desired modified polymeric article or alternatively, the composition of organic peroxide and ethylene polymer may first be formed into the desired shape and then modified by heating the shaped article above the temperature at which the organic peroxide dissociates into free radicals.

The modified polymeric article is placed in a suitable pressure vessel into which the permanent gas nitrogen is introduced at a pressure of between 1,000 and 12,000 lbs. per square inch and the pressure vessel is heated to a temperature higher than that of the softening temperature of the modified polymer until the heated modified polymer contains a sufficient quantity of gas to expand the modified polymeric article to a density of less than 5 lbs. per cubic foot and this is accomplished: (1) by releasing the pressure in one stage or in more than one stage to atmospheric pressure while the modified polymer is still at or above the softening temperature; or (2) by cooling the pressure vessel while at a gas pressure or not less than 25 lbs. per square inch to a temperature at which the modified polymeric article is rigid and unexpanded or partly expanded and releasing the gas pressure to atmospheric pressure. The rigid unexpanded or partly expanded modified polymeric article may be fully expanded by heating the article at atmospheric pressure to a temperature at or above the softening temperature of the modified polymer. An alternative procedure may be used to fully expand the article by heating the unexpanded or partially expanded article under a comparatively low gas pressure of 10–200 lbs. per square inch and suddenly releasing the gas pressure to atmospheric pressure.

As an example of ionising radiation which may be used for the purpose of this invention, high energy electrons produced by a Van de Graaf Accelerator have been found suitable for the modifying process but gamma rays, X-rays or other ionising radiation may also be used.

A convenient supply of free radicals is obtained by the dissociation with heat of an organic peroxide contained within the polymer to be modified. Dicumyl peroxide is a suitable organic peroxide which dissociates on heating to give free radicals but other similar materials may also be used.

For the purposes of this invention it is preferred that the gas pressure lies between 1,000 and 12,000 lbs. per square inch and the temperature during the gas absorption cycle is at least 10° F. higher than the softening temperature of the modified aliphatic olefin polymer used in the process.

It has been found that the modified and expanded material described in British Pat. No. 899,389 holds the impression imparted during the moulding operation better than other materials, such as expanded low density polyethylene unmodified through cross-linking. The better retention of the impression, which is attributed to the cross-linking, is reflected in a closer correspondence to the contours of the part to be supported. Best results have been obtained using Plastazote in which the level of cross-linking is that resulting from exposure of the material to 5–7 megarads of radiation, or from heating in the presence of between .2 and .3 parts by weight of an organic peroxide per 100 parts by weight of the polyethylene. Preferably the cell size is from about 0.3 mm. to about 0.7 mm. for best results.

The processing, and particularly plasticization, properties of ethylene homopolymers and copolymers having up to 20% comonomer content are generally analogous. It would be apparent to one skilled in the art to substitute such copolymers for the homopolymers with suitable adjustment of reaction conditions to allow for the plasticization of the polymer and the increased ease of cross-linking compared with the homopolymers. For example, in "Polythene" by A. Renfrew and P. Morgan, 1st Edition, 1957, pages 39–40 and 104, there is mentioned the observation that the use of co-polymerization with monomers containing large groups will interfere with crystallization of ethylene polymers. In connection with the melting points of copolymers it has been suggested that when the copolymer contains units in the polymer chain which do not fit into the crystal structure, the melting point of the copolymer is depressed. Thus, in general, the higher the crystallinity of a polyethylene, the higher will be its melting point. The 1960 edition of the same book on page 363 discusses ethylene vinyl acetate copolymers. As the vinyl acetate content of the copolymer is increased, the crystallinity is destroyed. Ethylene vinyl acetate copolymers of increasing vinyl acetate content gradually become less crystalline. At 20–30% vinyl acetate content the materials are rubbery with low tensile strength and high elongation. At 50–60% they are soft and tacky and very highly plasticized whereas above this range they become more like a modified polyvinyl acetate. This is confirmed in the "Encyclopaedia of Polymer Science and Technology," Volume 6, page 397 which shows that the X-ray crystallinity of ethylene vinyl acetate falls to 0 at about 24 mole percent vinyl acetate content.

| X-ray crystallinity: | Vinyl acetate monomer content, mole percent |
|---|---|
| 0 | 24 |
| 20 | 18 |
| 25 | 15 |
| 50 | 5 |

It can be deduced that the ethylene copolymers of 20% by weight or less comonomer content behave in an analogous manner to polyethylene. This is borne out by the Encyclopaedia of Polymer Science and Technology, Volume 6, pages 402, 409–410, the disclosures of which are incorporated herein by reference. The properties of high density polyethylene, low density polyethylene, ethylene vinyl acetate and ethylene ethyl acrylate are tabulated and compared on page 409 of this reference. It is readily apparent that the comonomers act as plasticizers and the properties of the polymer show a gradual trend across the scale. Reference is also made to Imperial Chemical Industries Limited's Technical Service Note A 111/2 which discusses the properties of ethylene vinyl acetate copolymers. The copolymer A 9839 referred to in this publication has 18% vinyl acetate content.

Copolymers of ethylene with ethyl acrylate are briefly discussed in "Crystalline Olefin Polymers" edited by R. A. V. Raff and K. W. Doak, Part 1, pages 343, 345. As the ethyl acrylate content is increased the crystallinity of the resulting copolymer is progressively reduced.

"Crystalline Olefin Polymers," Part II, edited by R. A. V. Raff and K. W. Doak at page 264 indicates that low amounts of vinyl acetate copolymerized with ethylene do not change significantly the properties from those characteristic of polyethylene polymerized under similar conditions. As the proportion of vinyl acetate is increased crystallinity is lowered and the copolymers are more flexible and extensible than polyethylene. Copolymers containing 20–30% vinyl acetate are elastomeric; the copolymers become softer at higher ranges and then become hard and stiff as the content of vinyl acetate exceeds 75%.

The disclosures in the aforementioned literature references are incorporated herein by reference.

An example of an expanded, cross-linked, ethylene vinyl acetate copolymer is the copolymer commercially available as "Evazote" sheet, density 45–55 kg. m.$^{-3}$ ("Evazote" is a Registered Trademark).

The physical properties of Plastazote and Evazote which in the present invention permit them to be moulded directly around a part of the patient without any serious discomfort or injury are summarized in the table below, and compared with the similar properties for unexpanded low density polyethylene which cannot be moulded direct.

TABLE

| Property | Plastazote | Evazote | L.D. polyethylene solid | H.D. polyethylene cellular |
|---|---|---|---|---|
| Density (kg. m.$^{-3}$) | 45 | 48 | 920 | 50 |
| Thermal conductivity (cals./cm.$^2$/cm./sec. ° C.) | 1.1×10$^{-4}$ | 1.2×10$^{-4}$ | 8.0×10$^{-4}$ | 1.3×10$^{-4}$ |
| Specific heat (cal./gm. at 20° C.) | 0.49 | 0.55 | 0.49 | 0.55 |
| Plasticizing temperature (° C.) | 140 | 135 | 150 | 155 |

It will be noted that the density of "Plastazote" is very much less than that of low density polyethylene. The heat content per unit volume, which is the product of the specific heat times the density is also very much less.

As stated before, the ethylene homopolymers and copolymers, which are to be used in the method of the present invention, must be at least partially cross-linked, that is they must have a degree of cross-linking corresponding to about 1 to about 10 megarads of radiations, preferably about 4 to about 8 megarads of radiation.

Cross-linking may be achieved by either ionizing radiation or treatment with an organic peroxide. The production of Plastazote as described in British patent specification No. 899,389 mentions that a suitable organic peroxide decomposing on heating to give free radicals is dicumyl peroxide. For this purpose of cross-linking the polymers and copolymers to be used in the method of the present invention, chemical cross-linking may be achieved by using approximately 0.1 parts by weight of dicumyl peroxide per 100 parts of polymer for each 2 megarad radiation equivalent. Correlations between equivalent amounts of other peroxides are known in the art.

The effect of cross-linking levels in polyethylene and ethylene ethyl acrylate copolymers are discussed and compared in an article by S. Bonotto in the Journal of Applied Polymer Science, Volume 9, pages 3819–3835 (1965), the disclosure of which is incorporated herein by reference. From Tables I and II in this article it is apparent that to achieve a given cross-linking density, the amount of peroxide increases from low density polyethylene through ethylene ethyl acrylate to high density polyethylene. However, at 3% peroxide equivalent to 70 megarads of radiation the ultimate tensile strength value at 160° C. for low density polyethylene is intermediate that of ethylene ethyl acrylate and high density polyethylene. It is known that ethylene ethyl acrylate has a considerable tensile strength at room temperature. In connection with ethylene vinyl acetate copolymers reference can be made once more to the I.C.I. Technical Service Note A111/2 which indicates on page 9 that ethylene vinyl acetate copolymers can be cross-linked with peroxide in much the same way as low density polyethylene. It is also observed that the presence of the carboxyl group in ethylene vinyl acetate copolymers enables cross-linking to occur far more readily than in the homopolymers, thus curing times are considerably shorter.

Having given consideration to the thermoplastics material suitable for use in the method of the present invention, that is low density or high density polyethylene, and copolymers of ethylene with up to 20% by weight of vinyl acetate or ethyl acrylate it can be seen that although emphasis is given herein to the use of the nitrogen-expanded, low density polyethylene, "Plastazote," any member of the above-mentioned group of thermoplastics materials can be used. It will be understood that the minor deviations and trends between the various members of the group in connection with the plasticization of the polymer and the length of the curing times in cross-linking can be allowed for in the practice of the present invention. In particular minor amounts of ethylene vinyl acetate can be blended into polyethylene as a processing aid. Such amounts are of the order of 2 to 6% by weight of the polymer blend.

In the practice of the method of the present invention a blank of appropriate size, shape and thickness for the part of the patient to be supported is cut from a sheet of the expanded thermoplastics material. This is heated to its plasticizing temperature and, immediately, while it is still plastic and pliable, moulded to the shape of the part and then, desirably while maintaining the assembly substantially immobile, allowed to cool and set when a rigid support is obtained. The material may be moulded either by pressing the part with the plasticized and pliable material, or simply by wrapping and simultaneously stretching the material around the part.

The thickness of the material employed will depend, of course, upon the part of the body for which the support is required, the size of the support, and the nature of the material. However, for most orthopaedic applications, the sheet of expanded thermoplastics material, say Plastazote, need be no more than 2.5 cm. thick, and it is often less, with about 0.3 cms. being the usual lower limit. It will be understood that sheets of more than 2-5 cm. in thickness can be used.

The heating operation is conveniently carried out using a circulating air oven, though other means such as infrared radiation may be employed. It is important that the expanded material shall not be overheated, otherwise breakdown will occur. The temperature to be attained, and the period for which the material is held at this temperature depend upon the particular material employed and the thickness of the sheet. With 1.25 cm. thick Plastazote sheet, heating at a temperature of about 130 to about 150° C., conveniently 140° C., for about 5 to 10 minutes plasticizes it without destroying its essential cellular character. With 0.6 cm. thick Plastazote an exposure time of about 3 to 6 minutes at this temperature is usually sufficient. When using Evazote sheet (1.25 cm.) a temperature of about 125 to about 145° C., conveniently about 135° C., and an exposure time at this temperature of about 5 to 10 minutes are generally suitable.

In the case of expanded high density polyethylene the softening temperatures are higher than those for expanded low density polyethylene.

For some applications, especially where extra strength and stiffness are sought, it may be desirable to reinforce the expanded thermoplastics material by incorporating within it one or more reinforcing members in the form of sheets, strips or rods. In this event, the reinforced articles are derived from composite structures comprising a mass of an expanded thermoplastics material and, embedded within the expanded mass, one or more reinforcing members. The reinforcing member, which should be relatively stiff at room temperature, must be pliable at the plasticizing temperature of the expanded material, but should not break down at this temperature. Advantageously, the reinforcing member is a sheet or strip of a thermoplastics material, preferably the same material in its unexpanded, i.e. higher density, uncross-linked form as the material of the main mass.

A sheet of such a composite structure can be heated, just like the expanded material alone, to the temperature at which both the expanded material and the reinforcing member are pliable, and then moulded to the required shape to give, when cool and set, a light but stiff support. An important feature consists in the use of one or more comparatively small reinforcing pieces of the solid thermoplastics material strategically located to give local stiffness just where required in the finished support.

In a convenient method of preparing the composite structures, two sheets of the expanded thermoplastics material, say Plastazote, are cut to a size and shape according to the desired finished support. Pieces of an ordinary, solid thermoplastics material, in this instance preferably polyethylene are sandwiched between the two sheets in the chosen positions. The sandwich is then heated in an oven to such a temperature that the sheets fuse to each other, and to the solid polyethylene sandwiched between them to form an integral mass, ready for thermoplastic shaping. The sandwich may be pressed during the heating operation to assist fusion.

When the expanded mass and the reinforcing pieces are of the same material, the temperature required for fusion is essentially the same as the plasticizing temperature, i.e. about 140° C. in the case of polyethylene. Hence, if desired, the fusion and the softening needed for shaping can be effected in a single heating operation. Alternatively, the composite structures may be reheated for moulding to the shape required for the support. This procedure has the advantage that suitable shapes and sizes of the composite structures can be preformed for use as supports for different requirements.

There is a tendency for air pockets to form in the heated material, and these should be squeezed out by pressure rolling over the surface of the hot sandwich. When perforations are provided in at least one of the Plastazote sheets, some of the air from the pockets can be squeezed into and so escape from these perforations. When a sandwich is being built up of pre-perforated material the layers should desirably be properly located to align the perforations. This can be ensured by placing the two perforated layers in contact, matching up the perforations and then fixing the sheets by spot welding at convenient intervals. The reinforcing pieces may then be inserted between the layers in spaces between welds.

Where a large area of reinforcement is necessary, for example, in the back of a spinal support, it is advisable to provide an extra thickness of the expanded material between the solid reinforcing material, which has a relatively high thermal conductivity and heat storage capacity, and the body as extra thermal insulation for protecting the patient from heat during shaping. Desirably, there should be a substantial margin between the edge of the expanded material and the solid insert so that any flow of the latter when heated does not bring this material beyond the edge of the composite when shaped to the patient; this is to avoid risk of contact of the hot solid material with either the patient or the operator who is shaping the material.

The solid reinforcing material may be embedded within the expanded mass by techniques other than sandwiching. For instance, pockets may be cut from the edge of a sufficiently thick sheet wide enough to enable the piece of solid reinforcing material to be inserted. The pockets must be wider than the insert to allow spread and long enough to allow spread and leave a small margin. The pockets may, for example, be cut by a hot knife which may be electrically heated.

For orthopaedic purposes, Plastazote of about 0.6 cms. thickness for each of the two outer layers of a sandwich is usually adequate for all supports with one or more inserts of about 0.16 cms. thickness of solid polyethylene. A further 0.6 cms. of thickness of Plastazote over a small area will usually suffice for the extra thermal insulation which may be needed over a reinforcement.

In building up a composite structure as previously described the heating is done in an oven. Fusion, however, has only to be inside the sandwich where the layers meet. Accordingly, the fusion may alternatively be effected by a dielectric heating and welding process wherein the sheets are held between electrodes connected to a high-frequency supply.

In connection with the surgical and veterinary applications, it has been found that the expanded thermoplastics material can provide a light-weight cast, splint, or other orthopaedic or surgical support which is useful in the treatment of injured parts of the body, such as broken limbs or arthritic joints, which is a very important area of medical practice.

The low thermal conductivity of the expanded thermoplastics material may, in some instances, especially in warm climates, give rise to heat transmission and perspiration problems which may cause discomfort to the patient. This can be avoided or ameliorated by providing perforations in the material for ventilation. These can be easily made by punching holes through the material.

The orthopaedic supports of this invention which are derived from suitable expanded thermoplastics materials, are superior in many important practical respects to previous support forms such as the conventional cast or laminate construction. This superiority is attributed to a combination of certain properties exhibited by the expanded thermoplastics materials including the following:

(i) When heated to a plasticizing temperature, they become pliable in which condition they can be readily moulded.

(ii) The materials have a low thermal conductivity and heat storage capacity. Accordingly, even at the plasticizing temperature, say around 140° C., they can be applied safely to a living body (human or other animal) which would be caused pain or injury by considerable exposure to such a temperature. Just as important, while in the plasticized state they may conveniently be handled and applied by the attendant physician or an assistant. Hence, they can easily be moulded to the required shape so providing an anatomically correct support, i.e. good correspondence to the body contours.

(iii) When allowed to cool and set, they regain their original rigidity, so that they hold, without requiring assistance, the impression imparted by the moulding operation. This again facilitates the obtention of an anatomically correct support.

(iv) The materials are light-weight, so that the patient's movement is less restricted than with a conventional cast, and they permit easier X-ray examination.

(v) The materials are buoyant so that hydrotherapy, which is often desirable with some conditions, such as paralysis, is possible with the support in position.

(vi) The materials are non-irritating, and readily obtainable in a toxicologically inert form.

(vii) Flammability is usually low and, further, flame resistance is easily imparted.

(viii) The materials are auto-adhesive at the plasticizing temperature, but at room temperature they do not stick to the skin. Consequently, the support may be conveniently and speedily removed for examination or, when necessary, interim treatment of the injured part. As a corollary to this, the support may be reused upon the same patient with or without reshaping or (with reshaping) upon successive patients.

(ix) The expanded materials are resilient so that they provide a "cushioned" support in which the abrasive and bruising hazards associated with previous thermoplastics supports are minimized.

(x) The materials are durable and are resistant to hot water and detergents so that the support withstands cleaning.

The following examples are specific examples of the method of the present invention.

Example 1

Figure 2:
FIG. 2 is a perspective small scale illustration of the cervical collar as shaped by the operator.

This Example is concerned with the preparation of a cervical collar and is illustrated by FIGS. 1 and 2 of the accompanying drawings.

A flat piece (45 cms. x 12.5 cms.) of Plastazote sheet is cut with a sharp knife from a larger sheet about 1.13 cms. thick, which contains many perforations (0.2 cms. diameter). The upper edge of the piece is scalloped so that it has the shape shown in FIG. 1. The shaped sheet is placed in a circulating air oven in which the shelf is lined with a polytetrafluoroethylene release sheet to prevent adhesion. The temperature of the oven is thermostatically controlled at 140° C., and the sheet is held at this temperature for five minutes. The patient is positioned near to the oven. The plasticized sheet is then removed from the oven and a quick check made by touch to ensure that the surface temperature is not excessive. The patient is instructed to keep his head still and not to extend his neck. The operator, standing behind the patient, quickly brings the softened and pliable sheet up to the patient's neck with the high point on the chin. He then manually stretches the material gently but firmly, first from one side, then the other, so moulding it into a shape closely conforming to the throat and neck. The Plastazote sets as it cools, and a lightweight, resilient, anatomically correct collar as illustrated in FIG. 2 is obtained after 3–4 minutes, for which period the patient keeps his neck as still as possible. The collar is then removed and, when quite cool, trimmed and finished using a sharp knife, an emery wheel and No. 1 glass paper. Any marks on the collar are removed with hot water and detergent. A Velcro (Registered Trademark) holding strap retained in place with double sided adhesive tape is attached to the collar so that it may be held securely and comfortably, in position.

Where extra strength and stiffness are called for, the cervical collar may be moulded from a composite structure in which piece of solid polyethylene is embedded within a mass of Plastazote. The solid reinforcement is so positioned in the composite structure that it is located at the front of the resulting collar.

Example 2

Figure 5:
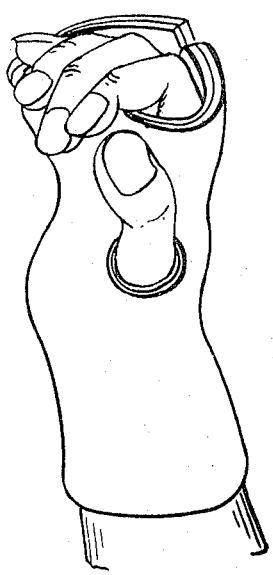
FIG. 5 is a perspective small scale illustration of the splint in position.
Figure 4:
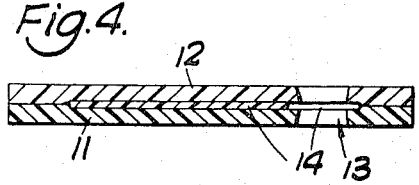
FIG. 4 is a cross-section along the line IV—IV of FIG. 3.
Figure 3:
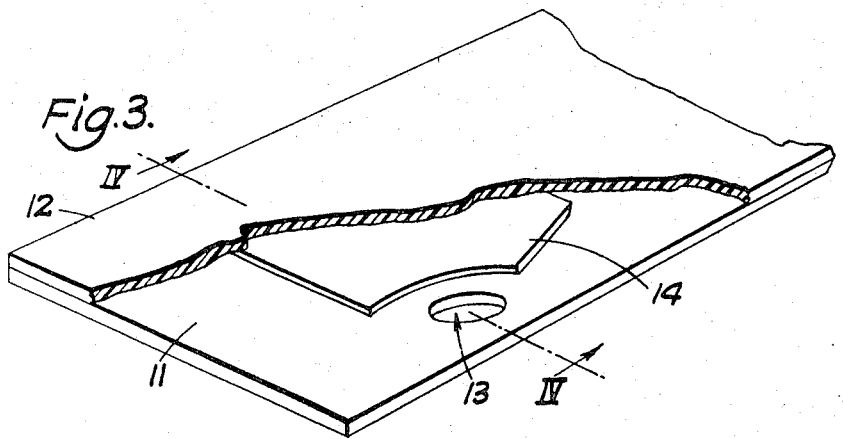
FIG. 3 is a partial fragmentary small scale plan view of a composite structure suitable for making a reinforced splint for the forearm, showing the arrangement of layers.

This Example is concerned with the preparation of a reinforced forearm splint, and reference will be made to FIGS. 3-5 of the accompanying drawings.

Two rectangular pieces 11 and 12 of 0.6 cms. thick Plastazote sheet are cut to an appropriate size and shape for the particular forearm to be supported. A hole 13 to accommodate the thumb is punched in each sheet. The diameter of this is slightly less than the diameter of the proximal joint. A shaped sheet 14 of solid polyethylene of a high viscosity grade and non-toxic quality is inserted, and correctly located, between the Plastazote sheets 11 and 12. The polyethylene sheet is about 0.16 cms. thick. A suitable grade of polyethylene is that marketed by Stanley Smith and Company, Isleworth, England, under the Registered Trademark "Vitrathene."

The three layer structure is placed in an oven in which the shelf is dusted with French chalk, and heated for 6-7 minutes at 140° C. The layers fuse together to give an integrated structure and all are softened. The pliable composite is then removed from the oven and brought up to the under surface of the forearm. After pushing the patient's thumb through the hole 13, the operator moulds the pliable sheet by hand pressure around the forearm. It sets in about 4 minutes to give a firm splint as illustrated in FIG. 5 in which the solid polyethylene sheet 14 extending from the metacarpal palmar surface down the center of the splint to about 2.5 cms. from the end of the splint on the forearm gives local reinforcement. After trimming and finishing straps are attached to the splint so that it may be held securely in position.

Where only a light forearm support is needed, as with many theumatoid arthritis cases, the splint may be fashioned from about 1.3 cms. thick Plastazote without reinforcement. In the absence of the solid polyethylene, the Plastazote plasticizers in a shorter time so that it need be in the oven for only about 5 minutes, and it also sets in less time.

Example 3

This Example is concerned with the preparation of a foot support for a patient suffering from metatarsalgia.

A first piece of Plastazote about 1.3 cms. thick is cut to about 30 cms. x 10 cms. A second piece of Plastazote also about 1.3 cms. thick cut to an oval shape and approximately 7.5 cms. long and 3 cms. wide is placed on top, and toward the center, of the first piece. The assembly is then heated in an air oven set at 140° C. until soft and pliable (about 5 minutes). Meanwhile, the patient is seated close to the oven, and another piece of 30 cms. x 10 cms. Plastazote placed on the floor in front of him. The pliable assembly is removed from the oven, its upper surface dusted with French chalk (to assist in obtaining an accurate impression), and then placed on the unheated piece of Plastazote which serves as a cushion. The patient stands, places a foot on the material in such a position that the thickest part of the Plastazote is behind the metatarsal heads. He then presses down, if possible with his full weight, for about 1-2 minutes. During this time, the foot is held still to prevent movement which could destroy the moulding, and the operator presses in the sides of the material so as to compress it and push it upwards under the arch of the foot. The Plastazote sets in about 2 minutes, but it is advisable to wait a further minute before the patient removes his foot. When the material is quite cool, it is trimmed and finished to give an insole with the shape required for the particular footwear. In trimming, the material should be carefully thinned down under the toes so as to leave the maximum amount of material wherein the depression has been formed. It is best to make two insoles at the same time, no that there are two identical supports for wearing on alternate days.

The insole so obtained may then disposed in the patient's footwear or used to make sandals. The sandals may be made by attaching a long sole of a micro-cellular rubber about 0.5 cm. thick to the under surface of the material. An elastic or webbing strap is fitted behind the metatarsal heads between the microcellular rubber and the material. The patient can slip his foot under this elastic (or webbing) strap and is provided with a simple, yet comfortable sandal. Many patients who suffer from gross metatarsalgia have never been able to wear sandals, and it is a great relief to them not to be restricted to surgical boots or shoes.

Plastazote foot supports made in a similar way, except that the oval piece included for localized additional thickness may be omitted, to the insole of this Example are also useful in the following conditions.

*Painful Heels:* Patients with an os Calcis spur or a painful heel find supports made of Plastazote and extending to the metatarsal heads most satisfactory. The material, during the moulding operation, depresses at the heel and, therefore, the weight is transferred to the long arch.

For geriatric patients with sore heels, heel boxes and anklets for wearing in bed have proved very satisfactory. These are moulded directly from 0.6 cm. thick Plastazote. Perforations of about 0.6 cm. diameter are made in the supports. They are held in position by means of tape passing through the holes nearest to the facings of the supports.

*Hallux Rigidus:* Full length insoles moulded with a depression to accommodate the big toe give relief.

*Hansons Disease:* Where gross deformities result from leprosy a 2.5 cm. thick Plastazote insole carefully shaped to the foot gives relief. By incorporating a micro-cellular sole, and a very low heel a patient can walk in absolute comfort and need not worry that the depressions will become rubbed and made sore. Further, there is some evidence to suggest that the direct contact between the ulcerated foot and the Plastazote assists healing.

Example 4

This Example illustrates the formation of surgical footwear in which shaped Plastazote instead of the convention cork is used to compensate for leg shortening.

In the formation of surgical footwear a press is used to fix the soles to the uppers. In a similar way a press can be used to shape a Plastazote sheet to the last of the patients' shoes. This is done by heating a piece of the material at 140° C. for about 5 minutes, placing the last on top of it, and then applying the assembly to the press. Having obtained the impression of the last on top of the material, the elevation is then built to the required height, say, 3.8 cms. at the heel, 2.5 cms. at the tread and 1.3 cms. at the toe. This elevation shapes readily, and the finish is good. Any allowance needed in the shoes to accommodate the Plastazote insole may be provided for by increasing the depth of the last by applying a 0.6 cm. thick piece of cork to the bottom of it. The advantages of such an elevation include the following:

(i) A Plastazote raise is only one-third of the weight of a similar raise in cork so that the shoe is lighter;

(ii) As Plastazote is flexible and cork rigid, shoes made in the former material give freedom of movement at the metatarsal joints; and (iii) The material can be moulded readily onto the base of a last and shaped to give a level base before making a shoe. The conventional method of shaping and fitting a cork insole to the base is time consuming.

Example 5

This Example illustrates the formation of a spinal support used, for instance, in the treatment of scoliosis or lumbar sacral strain.

A composite structure is made following the procedure of Example 2 except that the perforated Plastazote sheets are cut to a size and shape appropriate to that sort of support and the individual patient, the sheets contain no thumb hole, the solid polyethylene reinforcement is centrally located, so that in the finished support the strengthening piece is in the spinal area, and a third piece of Plastazote is laminated to the side which is to be in contact with the patient. The additional piece of Plastazote provides extra thermal insulation which is desirable because the polyethylene reinforcement (which may be fairly extensive) has a relatively high thermal conductivity. For scoliosis, where the deformity is to one side, the polyethylene strengthening piece is extended to the affected side. The plasticized composite structure is removed from the oven. Meanwhile, as much correction as possible is obtained using a head halter, and, with the back of the patient stretched, the pliable material is applied round the trunk, and moulded by stretching and pressing. When a satisfactory fit is obtained, the support is held immobile either manually or by means of an elasticated clamping device. After about 4–5 minutes, when the support has set, the support is removed. When quite cool, it is trimmed and finished in the usual way. Four holding straps fixed to the support, help to retain it comfortably in position in daily wear.

Example 6

A high density polyethylene supplied by British Petroleum and known as high density rigid type 3 was irradiated with 5 megarads of radiation and gassed with nitrogen at pressures of 4,800 p.s.i. to give an expanded cross-linked product with a density of 49.7 kg. m.$^{-3}$ (3.1 lbs./ft.$^3$). The expanded, cross-linked high density polyethylene was heated to a temperature of about 155° C. in the practice of the method of the present invention. Good results were obtained.

Example 7

In a similar manner as in the foregoing example, a sample of ethylene vinyl acetate copolymer, supplied by I.C.I. under the number A 9839 and containing 18% by weight of vinyl acetate, was irradiated with 5 megarads of radiation gassed with nitrogen at pressures of 4,800 p.s.i. to give an expanded cross-linked product having a density of 46.5 kg. m.$^{-3}$ (2.9 lbs./ft.$^3$). When a sheet of this expanded ethylene vinyl acetate copolymer was heated to a temperature of aproximately 140° C. it could be manipulated easily in the method of the present invention.

Aside from the specific applications illustrated in the foregoing Examples, there are a number of similar applications for this invention including, for instance, leg splints, elbow splints, and the formation of external prostheses. The splints generally require reinforcement. The strengthening piece for a leg splint is usually placed at the back of the leg, the width being dependent on the size and deformity of the limb. The strengthening piece for an elbow splint is usually placed at the center of the elbow, the depth depending upon the disability. In the formation of external prostheses, such as an artificial muscle for an atrophied leg, a sheet of flesh-colored plasticized Plastazote is applied to the affected leg, and carefully shaped to match the normal leg. After smoothing down the edges it is worn under a thin elastic stocking covered by an ordinary stocking. The prostheses is almost invisible. The lightness of the prostheses and freedom from the embarassment occasioned by odd-sized calves and muscles are great advantages. Other prostheses which has been fashioned from plasticized Plastazote include foot prostheses after Symes amputations, and an artificial buttock after a hindquarter amputation.

We claim:
1. A method of forming a cast for a portion of a living body from a sheet of nitrogen foamed, closed cell, at least partially cross-linked polyethylene, the polyethylene in said sheet having a degree of cross-linking corresponding to that resulting from the absorption therein of between 1 and 10 megarads of radiation, and having a density corresponding to that obtained by subjecting such cross-linked polyethylene to nitrogen foaming at a pressure between 1,000 and 12,000 pounds per square inch and at a temperature at least 10° F. higher than the softening temperature of the cross-linked polyethylene, said sheet having an initial thickness in the range of from about 0.3 centimeters upwards, said method comprising:
   (a) heating a sheet of said polyethylene to a temperature within the range of from about 125° C. to about 155° C. to thereby plastify the sheet and render the same pliable without destruction of its foamed, cellular character;
   (b) placing the heated sheet into direct contact with a portion of a living body and applying sufficient pressure to the pliable sheet to cause the same to be shaped into a cast having a configuration complementing the shape of said portion; and
   (c) permitting said shaped cast to cool so that it resumes its original degree of rigidity.

2. A method as claimed in claim 1 wherein the sheet is heated to a temperature of from 125° C. to 145° C.

3. A method as claimed in claim 1 wherein the sheet of foamed thermoplastics material has at least one heat formable reinforcing member embedded therein, said reinforcing member being a sheet, strip or rod.

4. A method as claimed in claim 3 wherein the reinforcing member is made of the same material in the unfoamed, uncross-linked form as the sheet.

5. A method of forming a cast for a portion of a living body from a sheet of nitrogen foamed, closed cell, at least partially cross-linked low density polyethylene, the polyethylene in said sheet having a degree of cross-linking corresponding to that resulting from the adsorption therein of between 1 and 10 megarads of radiation, and having a density corresponding to that obtained by subjecting such cross-linked polyethylene to nitrogen foaming at a pressure betwen 1,000 and 12,000 pounds per square inch and at a temperature at least 10° F. higher than the softening temperature of the cross-linked polyethylene, said sheet having an initial thickness in the range of from about 0.3 centimeters upwards, said method comprising:
   (a) heating a sheet of said polyethylene to a temperature within the range of from about 125° C. to about 155° C. to thereby plastify the sheet and render the same pliable without destruction of its foamed, cellular character;
   (b) placing the heated sheet into direct contact with a portion of a living body and applying sufficient pressure to the pliable sheet to cause the same to be shaped into a cast having a configuration complementing the shape of said portion; and
   (c) permitting said shaped cast to cool so that it resumes its original degree of rigidity.

6. A method of forming a cast for a portion of a living body from a sheet of nitrogen foamed, closed cell, at least partially cross-linked thermoplastics material of high density polyethylene, said thermoplastics material having a density of from 10 to 100 kilograms per cubic meter (kg. m.$^{-3}$) and having a degree of cross-linking corresponding to that resulting from an exposure thereof to 1 to 10 megarads of radiation, said sheet having an initial thickness in the range of from about 0.3 centimeters upwards, said method comprising:
   (a) heating a sheet of said thermoplastics material to a temperature within the range of from about 125° C. to about 155° C. to thereby plastify the sheet and render the same pliable without destruction of its foamed, cellular character;

(b) placing the heated sheet into direct contact with a portion of a living body and applying sufficient pressure to the pliable sheet to cause the same to be shaped into a cast having a configuration complementing the shape of said portion; and (c) permitting said shaped cast to cool so that it resumes its original degree of rigidity.

7. A method as claimed in Claim 6 wherein the sheet is heated to a temperature of from 125° C. to 145° C.

8. A method as claimed in Claim 6 wherein the thermo plastics material has a degree of cross-linking corresponding to that resulting from the exposure of the material to 4 to 8 megarads of radiation.

9. A method as claimed in Claim 6 wherein the sheet of foamed thermoplastics material has at least one heat formable reinforcing member embedded therein, said reinforcing member being a sheet, strip or rod.

10. A method as claimed in Claim 9 wherein the reinforcing member is made of the same material in the unfoamed, uncross-linked form as the sheet.

11. A method of forming a cast for a portion of a living body from a sheet of nitrogen foamed, closed cell, at least partially cross-linked thermoplastics material of copolymers of ethylene with vinyl acetate containing up to 20% by weight of vinyl acetate, said thermoplastics material having a density of from 10 to 100 kilograms per cubic meter (kg. m.$^{-3}$) and having a degree of cross-linking corresponding to that resulting from an exposure thereof to 1 to 10 megarads of radiation, said sheet having an initial thickness in the range of from about 0.3 centimeters upwards, said method comprising:

(a) heating a sheet of said thermoplastics material to a temperature within the range of from about 125° C. to about 155° C. to thereby plastify the sheet and render the same pliable without destruction of its foamed, cellular character;

(b) placing the heated sheet into direct contact with a portion of a living body and applying sufficient pressure to the pliable sheet to cause the same to be shaped into a cast having a configuration complementing the shape of said portion; and (c) permitting said shaped cast to cool so that it resumes its original degree of rigidity.

12. A method as claimed in Claim 11 wherein the sheet is heated to a temperature of from 125° C. to 145° C.

13. A method as claimed in Claim 11 wherein the thermoplastics material has a degree of cross-linking corresponding to that resulting from the exposure of the material to 4 to 8 megarads of radiation.

14. A method as claimed in Claim 1 wherein the sheet of foamed thermoplastics material has at least one heat formable reinforcing member embedded therein, said reinforcing member being a sheet, strip or rod.

15. A method as claimed in Claim 14 wherein the reinforcing member is made of the same material in the unfoamed, uncross-linked form as the sheet.

16. A method of forming a cast for a portion of a living body from a sheet of nitrogen foamed, closed cell, at least partially cross-linked thermoplastics material of copolymers of ethylene with ethyl acrylate containing up to 20% by weight of ethyl acrylate, said thermoplastics material having a density of from 10 to 100 kilograms per cubic meter (kg. m.$^{-3}$) and having a degree of cross-linking corresponding to that resulting from an exposure thereof to 1 to 10 megarads of radiation, said sheet having an initial thickness in the range of from about 0.3 centimeters upwards, said method comprising:

(a) heating a sheet of said thermoplastic material to a temperature within the range of from about 125° C. to about 155° C. to thereby plastify the sheet and render the same pliable without destruction of its foamed, cellular character;

(b) placing the heated sheet into direct contact with a portion of a living body and applying sufficient pressure to the pliable sheet to cause the same to be shaped into a cast having a configuration complementing the shape of said portion; and (c) permitting said shaped cast to cool so that it resumes its original degree of rigidity.

17. A method as claimed in Claim 16 wherein the sheet is heated to a temperature of from 125° C. to 145° C.

18. A method as claimed in Claim 16 wherein the thermoplastics material has a degree of cross-linking corresponding to that resulting from the exposure of the material to 4 to 8 megarads of radiation.

19. A method as claimed in Claim 16 wherein the sheet of foamed thermoplastics material has at least one heat formable reinforcing member embedded therein, said reinforcing member being a sheet, strip or rod.

20. A method as claimed in Claim 19 wherein the reinforcing member is made of the same material in the unfoamed, uncross-linked form as the sheet.

References Cited

UNITED STATES PATENTS

| | | | |
|---|---|---|---|
| 3,490,444 | 1/1970 | Larson | 264—222 UX |
| 3,662,057 | 5/1972 | Webster et al. | 264—54 X |

FOREIGN PATENTS

| | | |
|---|---|---|
| 1,242,053 | 8/1971 | Great Britain. |

OTHER REFERENCES

Plastics World, vol. 19, No. 9, September 1961, "Orthopaedic Splints," page 52.

PHILIP E. ANDERSON, Primary Examiner

U.S. Cl. X.R.

128—89 R, 90; 156—78; 161—161; 264—50, 222, 322, DIG. 18